(12) United States Patent
Mitchell

(10) Patent No.: US 10,386,007 B2
(45) Date of Patent: Aug. 20, 2019

(54) COATING/MEMBRANE REPAIR KIT

(71) Applicant: PRO PAINT GEAR INC., Brighton (CA)

(72) Inventor: Jack A. Mitchell, Brighton (CA)

(73) Assignee: PRO PAINT GEAR INC., Brighton, Ontario (CA)

( * ) Notice: Subject to any disclaimer, the term of this patent is extended or adjusted under 35 U.S.C. 154(b) by 41 days.

(21) Appl. No.: 15/738,684

(22) PCT Filed: Jun. 27, 2016

(86) PCT No.: PCT/CA2016/050756
§ 371 (c)(1),
(2) Date: Dec. 21, 2017

(87) PCT Pub. No.: WO2017/000066
PCT Pub. Date: Jan. 5, 2017

(65) Prior Publication Data
US 2018/0187818 A1 Jul. 5, 2018

Related U.S. Application Data

(60) Provisional application No. 62/266,307, filed on Dec. 11, 2015, provisional application No. 62/186,658, filed on Jun. 30, 2015.

(51) Int. Cl.
*F16L 55/16* (2006.01)
*F16L 55/168* (2006.01)
(Continued)

(52) U.S. Cl.
CPC ......... *F16L 55/1683* (2013.01); *F16L 55/18* (2013.01); *F17C 1/00* (2013.01); *F17D 5/02* (2013.01)

(58) Field of Classification Search
CPC ....... F16L 55/18; F16L 55/175; F16L 55/172; F16L 55/1683
(Continued)

(56) References Cited

U.S. PATENT DOCUMENTS

RE12,703 E * 10/1907 Corcoran ..................... 138/99
1,662,852 A * 3/1928 De La Mare ......... F16L 55/175
118/DIG. 11
(Continued)

OTHER PUBLICATIONS

Written Opinion of the International Searching Authority, related International Application No. PCT/CA2016/050756, dated Oct. 20, 2016.
(Continued)

*Primary Examiner* — Patrick F Brinson
(74) *Attorney, Agent, or Firm* — Hill & Schumacher

(57) ABSTRACT

There is disclosed a coating/membrane device for repairing defects such as holes or cracks in the membranes used to coat oil and gas metal pipes used in oil and gas pipelines and other metal based holding tanks, metal water pipes and the like. In one embodiment the device includes an applicator for applying a patch over a defect in the membrane. The device is placed over the defect and is temporarily bonded to the membrane, and an applicator having a patch removably attached thereto is activated to apply the patch to the membrane covering the defect. In another embodiment the device is placed over the defect and is temporarily bonded to the membrane, and a liquid sealant is injected into a chamber which then sets to seal the sealant over the defect and the device is removed.

21 Claims, 12 Drawing Sheets

(51) Int. Cl.
*F16L 55/18* (2006.01)
*F17C 1/00* (2006.01)
*F17D 5/02* (2006.01)

(58) Field of Classification Search
USPC .................................................. 138/99, 97
See application file for complete search history.

(56) References Cited

U.S. PATENT DOCUMENTS

| | | | |
|---|---|---|---|
| 4,497,418 A | 2/1985 | Nunlist | |
| 4,861,401 A | 8/1989 | Miura et al. | |
| 5,301,983 A * | 4/1994 | Porowski | F16L 55/16 |
| | | | 138/99 |
| 5,423,932 A | 6/1995 | Schinabeck | |
| 5,500,064 A * | 3/1996 | Schinabeck | B29C 73/10 |
| | | | 137/15.11 |
| 5,924,257 A | 7/1999 | Mussler et al. | |
| 6,013,343 A * | 1/2000 | Radke | F16L 11/02 |
| | | | 156/64 |
| 6,685,784 B1 | 2/2004 | Jacino et al. | |
| 9,095,736 B2 * | 8/2015 | Kochelek | A62C 35/68 |

OTHER PUBLICATIONS

International Search Report, related International Application No. PCT/CA2016/050756, dated Oct. 20, 2016.

* cited by examiner

Section A-A

Section A-A

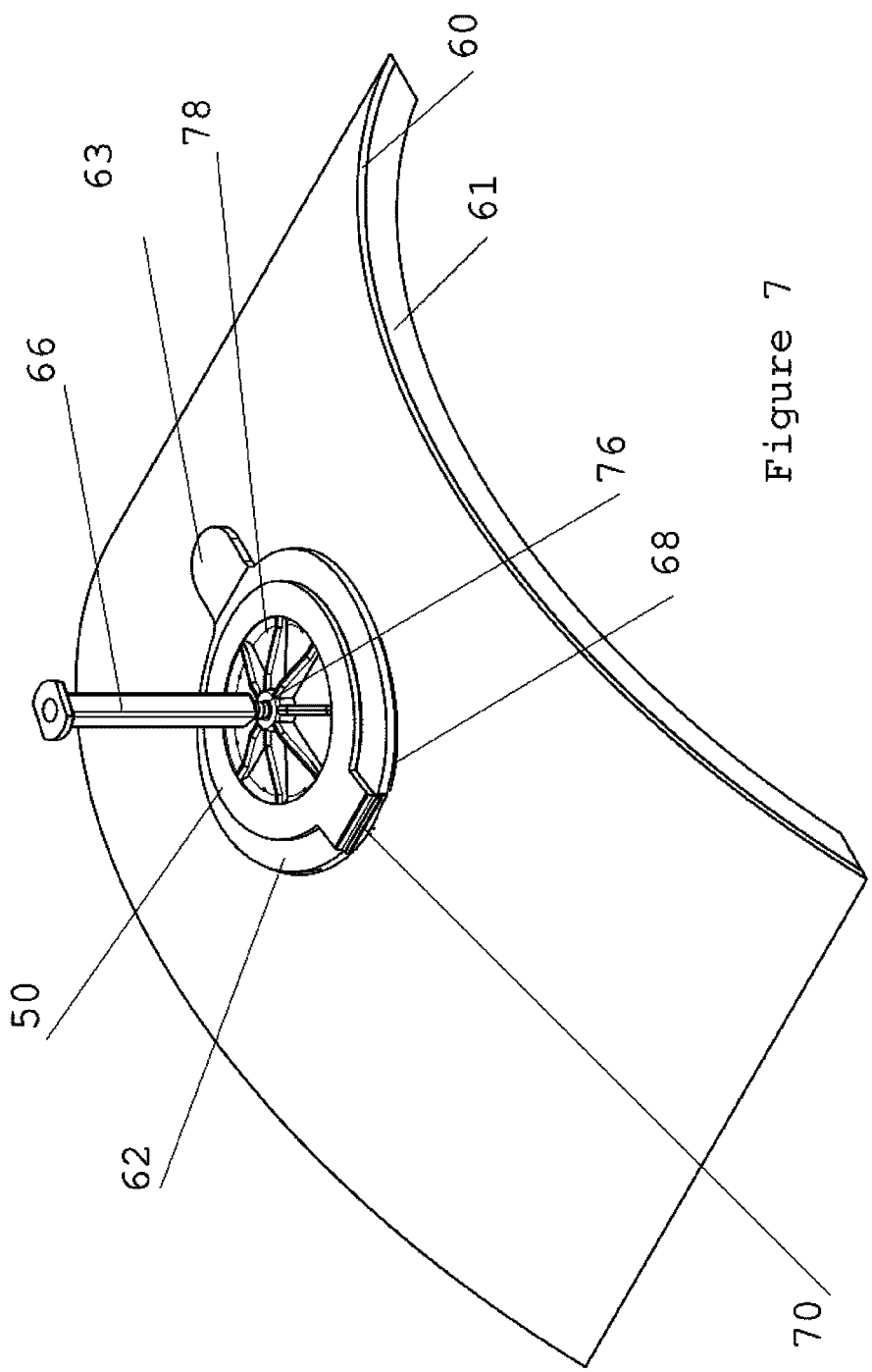

Section A-A

Section A-A

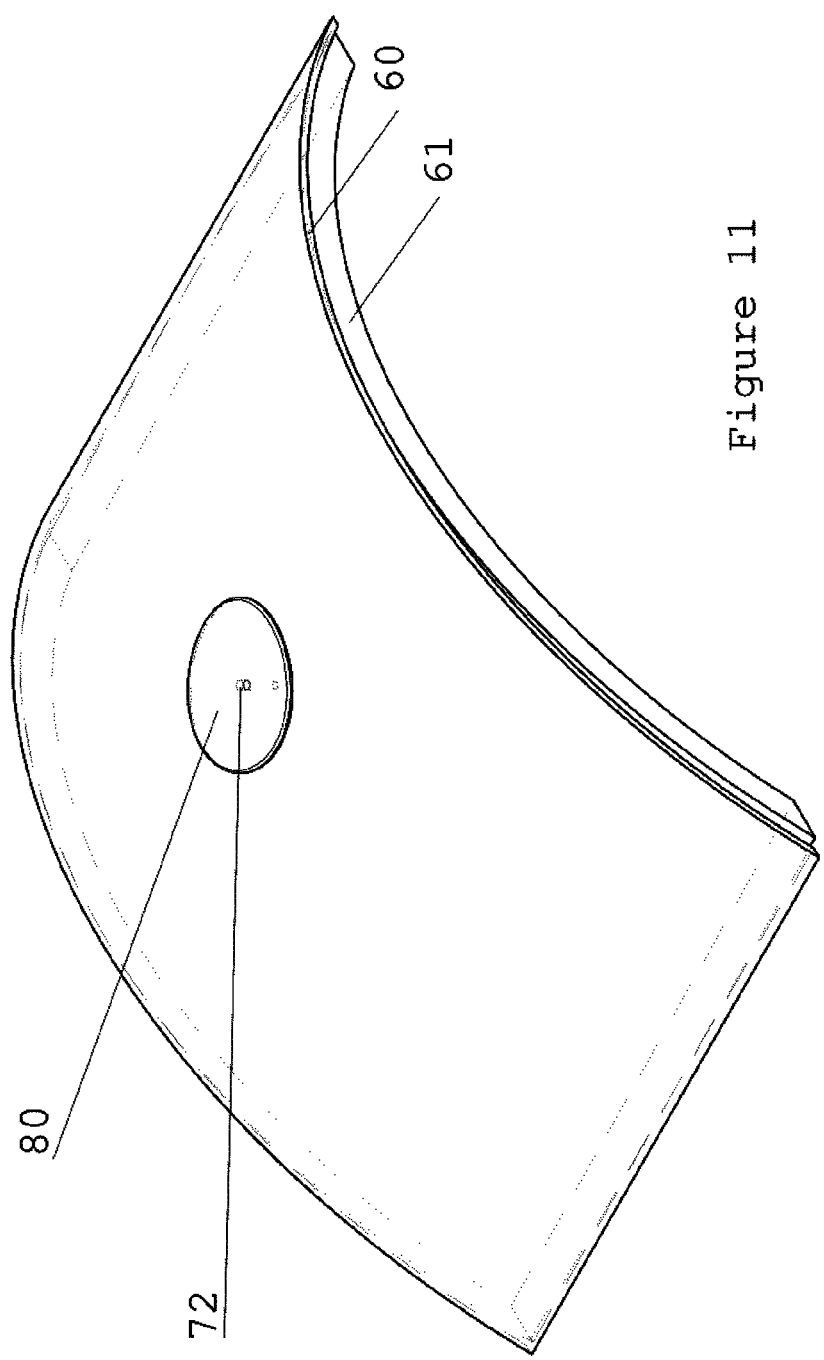

COATING/MEMBRANE REPAIR KIT

FIELD

The present disclosure relates to a repair kit for repairing damaged or defective coatings or membranes covering metal pipes, tank linings or structural steel.

BACKGROUND

Currently there is no standardized repair solution for addressing the repair of small area, defects or holidays on pipeline coatings, tank linings or structural steel members. Each contractor contracted to conduct repairs does these repairs a bit differently from each other. Generally the process of repair is time consuming and labour intense. Since the repairs are carried out in different ways with different personnel, there is potential for failure of these repaired sections.

SUMMARY

The present disclosure provides a repair kit for repairing damaged or defective coatings or membranes covering metal pipes, tank linings or structural steel.

In summary, there is disclosed herein device for repairing membranes coating metal pipes and metal storage tanks which comprises a patch member having top and bottom surfaces, and a protective outer wrap having an inner bottom surface and an outer bottom surface. The protective outer wrap includes a recessed portion having a size and shape to receive therein the patch member such that the top surface of the patch member is in physical contact with the inner bottom surface of the recessed portion. A removable protective film is applied to the bottom surface of the patch member. The device includes a patch applicator which includes a support member having a top surface, a bottom surface, an aperture extending therethrough and an adhesive layer coated on the bottom surface. A removable protective film is applied over the adhesive for protection of the adhesive layer until the device is employed. The kit includes an arm having first and second end portions with the first end portion hingedly or pivotally attached to the top surface of the support member and is pivotally movable between a closed position and an open position. The outer bottom surface of the protective outer wrap member is detachably attached to a bottom surface of the second end portion of the arm. The arm has a length selected such that when in the closed position the patch member is generally centrally located in the aperture.

When defects have been detected in the membranes covering pipes or storage tanks, the protective film located on the adhesive covering the bottom surface of the support member is peeled off and the support member is temporarily bonded on top of the membrane covering the metal with the defect centrally disposed in the aperture defined by the support member.

The removable protective film applied to the bottom surface of the patch member is removed when the arm is in the open position thereby exposing the bottom surface of the patch member. The arm is then pivoted to the closed position such that the bottom surface of the patch member covers the defect, and the protective outer wrap is detached from the bottom surface of the arm and the patch applicator is detached from the membrane to leave behind the patch member on the membrane which is covered by the protective outer wrap.

The device may include the protective outer wrap being rigid, made of a plastic, polymer material and the recessed portion defines an circumferentially disposed side wall extending outwardly away from the inner bottom surface to provide a chamfered side wall transition between said inner bottom surface and an outer peripheral circumferentially disposed side wall section that is substantially parallel to the inner bottom surface. The outer peripheral circumferentially disposed side wall section is coplanar with the bottom surface of the patch member and has an adhesive located thereon for bonding to the membrane.

The chamfered side wall may be angled at approximately 45° with respect to the inner bottom surface of the protective outer wrap. The patch member may have a complimentary shape matched to the recessed portion with the chamfered transition of side wall such that recessed portion is completely filled by the patch member.

The may include a temporary removable clearly visible indicator patch for application to a defect site on the membrane for visually marking the defect site after detection of the defect and prior to temporarily bonding patch applicator to the membrane.

The kit may include a unique identifier permanently affixed to the protective outer wrap which can be accessed at a later date and information downloaded from the identifier. The unique identifier may be a barcode, or it may be a radio frequency identification device (rfid).

The patch member may be made of a conforming material such that upon application of the patch member by the patch applicator to the defect in the membrane, the conforming material fills, seals or covers a void produced by the defect.

The patch member may be made of a polymeric material, including but not limited to polyethylene, polypropylene, polyvinylchloride (PVC) or polycarbonate as well as various other flexible polymers.

In another embodiment there is provided a device for repairing membranes coating metal pipes and metal storage tanks, comprising:

a) a syringe for holding a liquid precursor of a sealant material;
b) a support member having a top surface, a bottom surface, an aperture extending therethrough and a first adhesive layer coated on said bottom surface;
c) a lid portion having first and second end portions, said first end portion hingedly attached to said support member and pivotally movable between a closed position and an open position, said lid portion having an inner surface with a raised peripheral shoulder and a second adhesive layer being coated on the raised peripheral shoulder, said mould portion having an aperture extending therethrough for receiving an exit tip of said syringe, and a plurality of vent holes disposed around the periphery of the mould portion adjacent to the raised peripheral shoulder; and
d) wherein in operation, said support member is positioned over a defect in a membrane with said defect generally centered in said aperture, said support member is pressed into said membrane to temporarily bond to said membrane via said first adhesive layer, and wherein said lid portion is pivoted into the closed position and pressed onto the top surface of said support member to temporarily bond to a top of the membrane via said second adhesive layer, and wherein said exit tip of said syringe is inserted into said aperture and the liquid precursor is injected into a chamber defined between said membrane and an interior surface of said lid portion, and upon liquid precursor exiting said chamber through said vent holes, ceasing injection of further liquid precursor and allowing the liquid precursor to cure to solid form and thereafter removing the device leaving behind a patched defect.

There may be included removable protective films applied over the first and second adhesive layers, which are removed during the patching process.

The mould portion and the support member may be made of a polymer or plastic material, and the mould portion may be hingedly attached to the support member via a living hinge.

The sealant material may be any one or combination of epoxies, urethanes, ultra-violet curing compounds or other resinous materials.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 6b shows a cross section side view of the patch and outer protective wrap firmly affixed to the membrane on the pipe taken along line A-A of FIG. 6a.

FIG. 7 shows a perspective view of another embodiment of a repair device for repairing a membrane defect in accordance with the present disclosure with the device shown on the pipe during the operation of repairing the membrane.

FIG. 10b a cross sectional view taken along the line A-A of FIG. 10a.

FIG. 11 shows the patched membrane after removal of the repair device.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "membrane" refers to coatings and linings typically used for coating metal structures such as but not limited to pipes used in pipelines, storage tanks and the like to give a few non-limiting examples.

In the oil and gas servicing industry, the pipes are exposed when either a spill has been detected or for routine maintenance. Metal pipes through which the hydrocarbons flow are coated on the outside with a polymeric based coating or membrane. Any defect in this membrane that results in exposure of the metal surface to the environment will result in serious corrosion of the metal leading to a rupture of the corroded pipe section which will result in a spill.

Figure 1A:
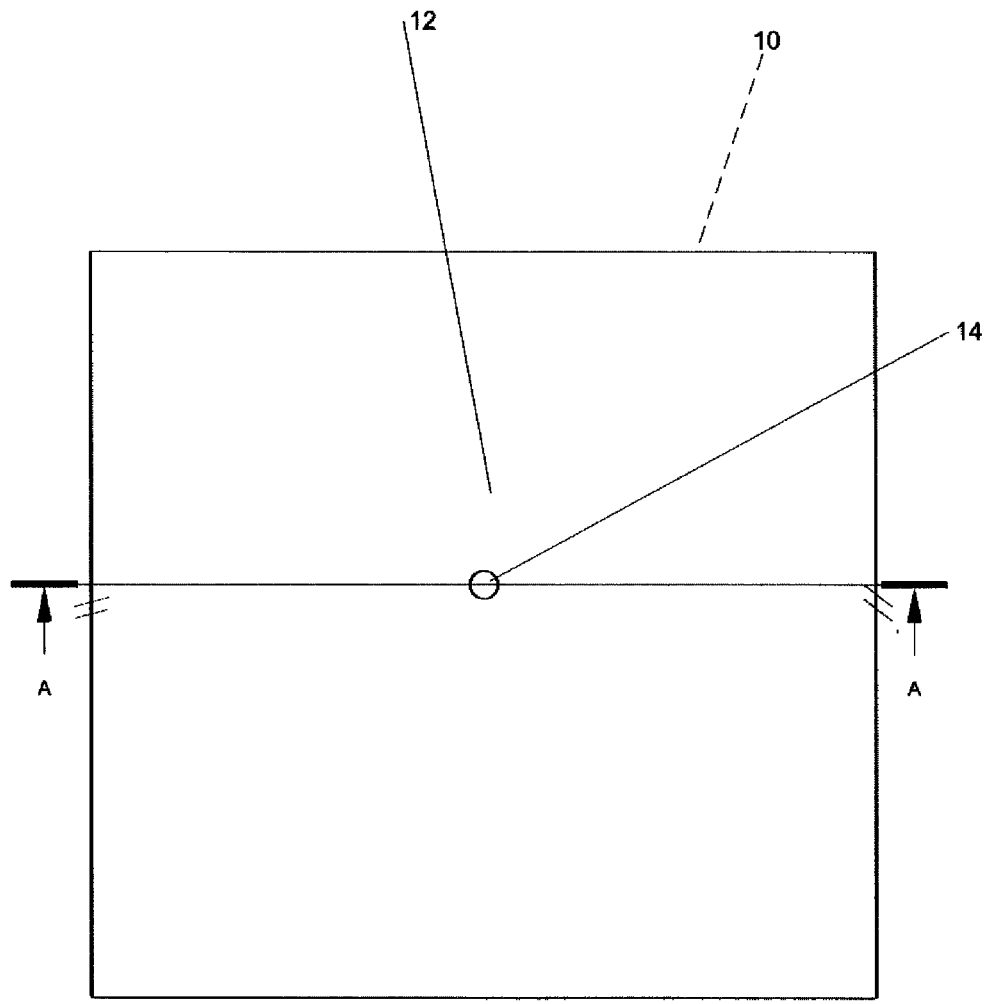
FIG. 1a is a top view of a section of a pipe covered with a membrane and a defect shown in the membrane.
Figure 1B:
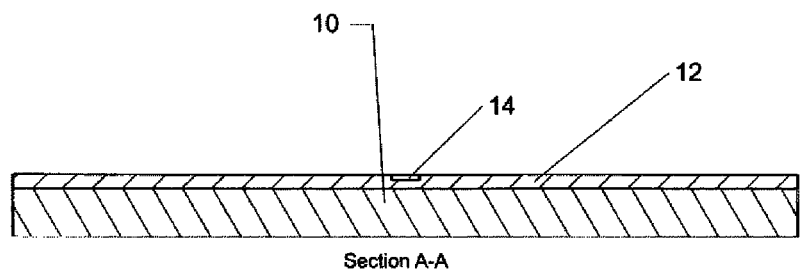
FIG. 1b is a sectional side view of the membrane coated pipe of FIG. 1a showing the defect.
Figure 2:
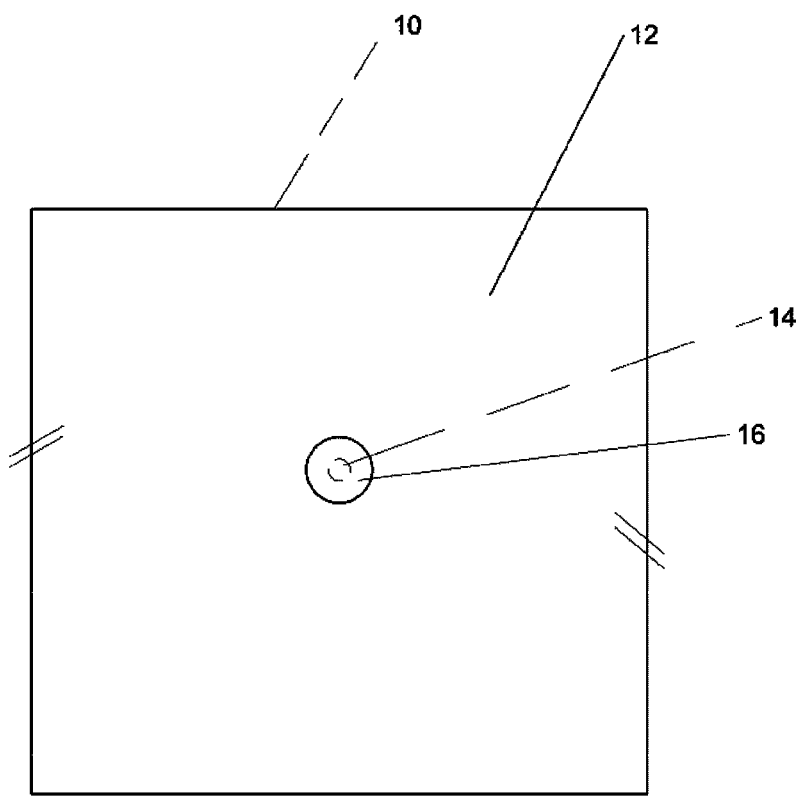
FIG. 2 is a top view of a section of a pipe covered with a membrane and a defect shown in the membrane covered by a temporary visual marker.

FIG. 1a is a top view of a section of a pipe 10 covered with a membrane 12 and a defect 14 shown in the membrane 12. FIG. 1b is a sectional side view of the membrane coated pipe 10 of FIG. 1a showing the defect 14. FIG. 2 is a top view of a section of pipe 10 covered with the membrane 12 and a defect 14 shown in the membrane 12 covered by a temporary visual marker 16. The temporary visual markers 16 may be brightly colored to be easily seen. The markers 16 may be applied as each defect 14 is identified along a section of pipe, and after the detection process is completed the workers may return to each site containing a marker 16 which is then removed and the repair device is applied as will be discussed below.

Figure 3:
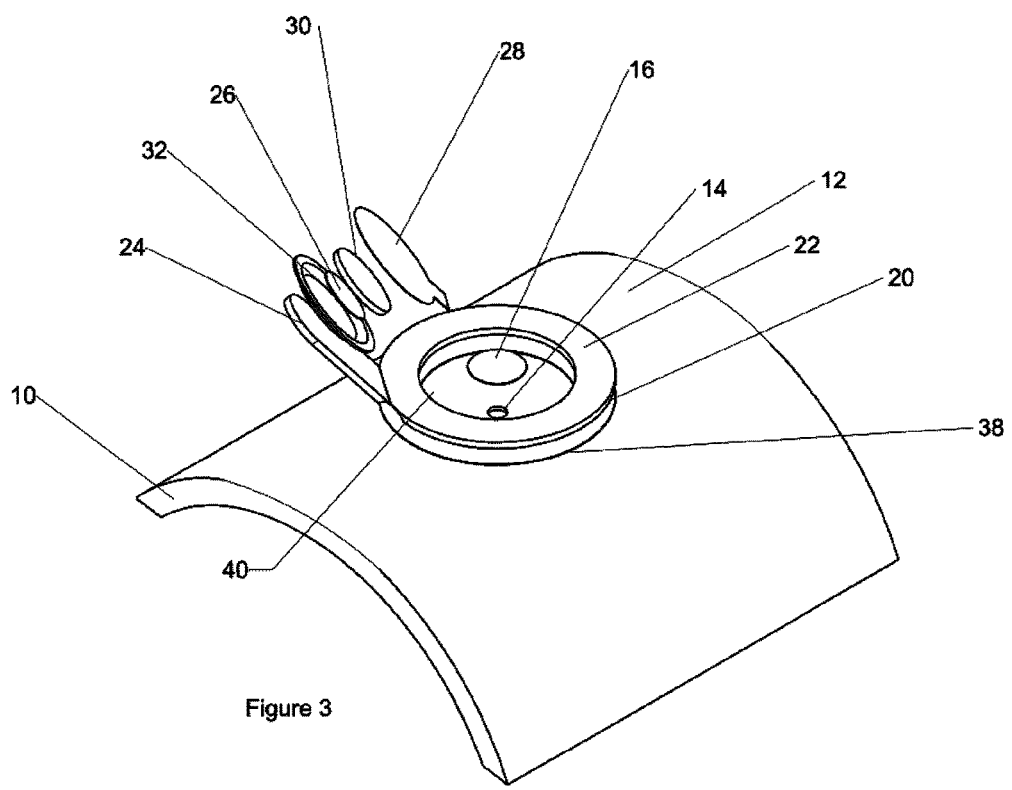
FIG. 3 is a perspective, disassembled view of an embodiment of a patch applicator assembled with a patch mounted on a pipe for repairing a membrane defect in accordance with the present disclosure.

Referring to FIG. 3, a repair device for membranes coating metal pipes and metal storage tanks is shown mounted on a membrane 12 in the open position and partially disassembled. The repair device includes a patch member 30 having top and bottom surfaces, a protective outer wrap 32 having an inner bottom surface and an outer bottom surface. The protective outer wrap 32 includes a recessed portion having a size and shape to receive therein the patch member 30 such that the top surface of the patch member 30 is in physical contact with the inner bottom surface of the recessed portion. The device includes a removable protective film 28 applied to the bottom surface of the patch member 30. The device further includes a patch applicator 20 which in turn includes a support member or open frame 22 having a top surface, bottom surface with the support member defining an aperture 40 extending therethrough and an adhesive layer coated on said bottom surface and a removable protective film 38 applied over the adhesive layer. It is noted that in FIG. 3 aperture 40 is shown as being a circular aperture as formed by support member 22 but it will be appreciated that support member 22 need not be circular, it could be partially circular or it could be any other shape, as long as the aperture is large enough so that the patch 30 can be pressed down onto the membrane within the open frame defined by frame 22.

Figure 4A:
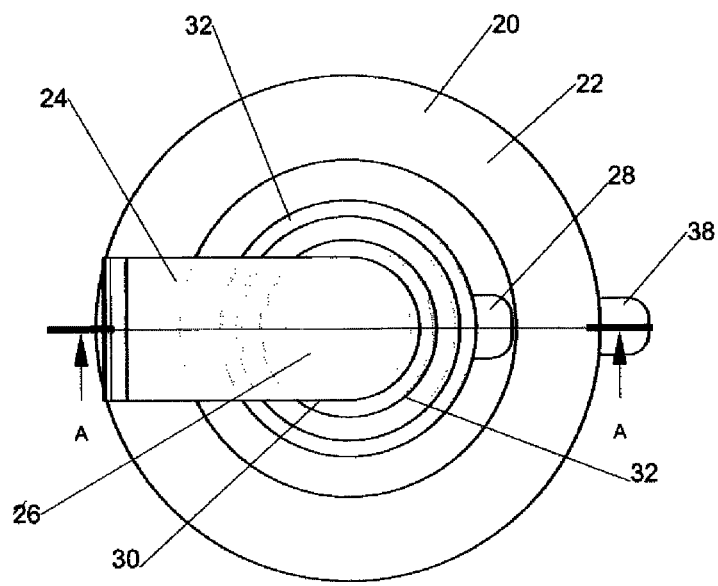
FIG. 4a shows a top view of the patch applicator of FIG. 3 in the closed position.
Figure 4B:
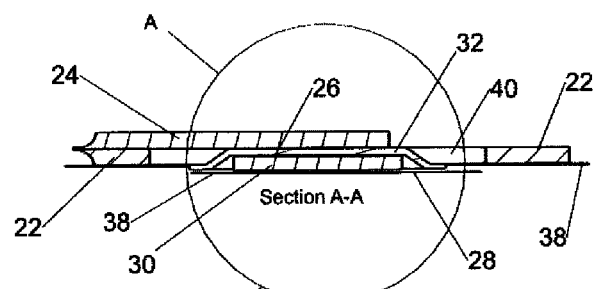
FIG. 4b shows a sectional view of the patch applicator of FIG. 4a along the line A-A.
Figure 5:
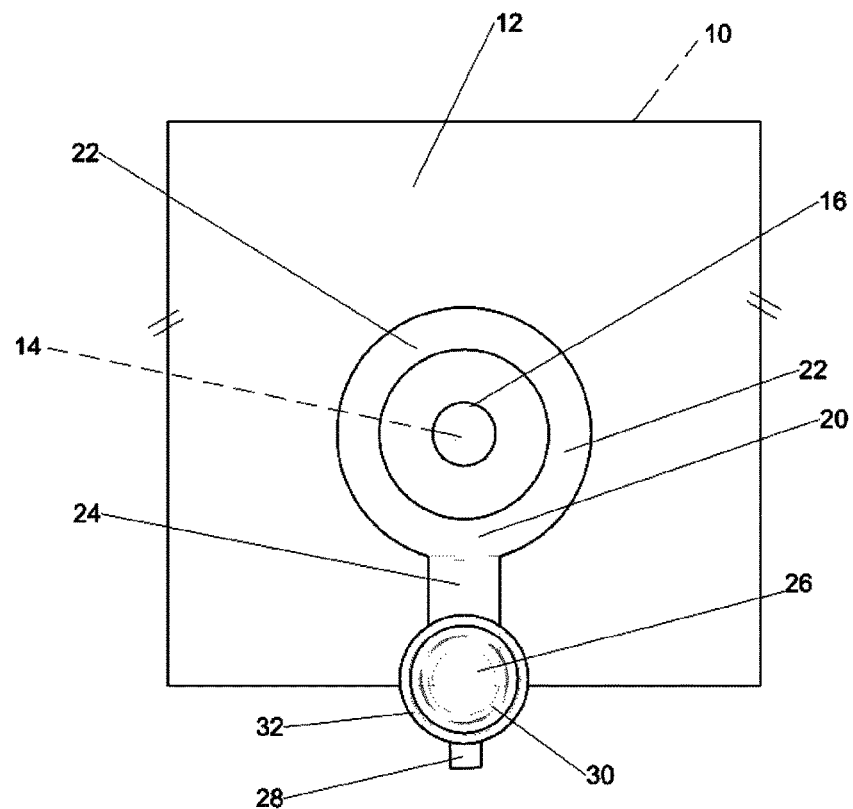
FIG. 5 shows a top view of the patch applicator in the open position.
Figure 6A:
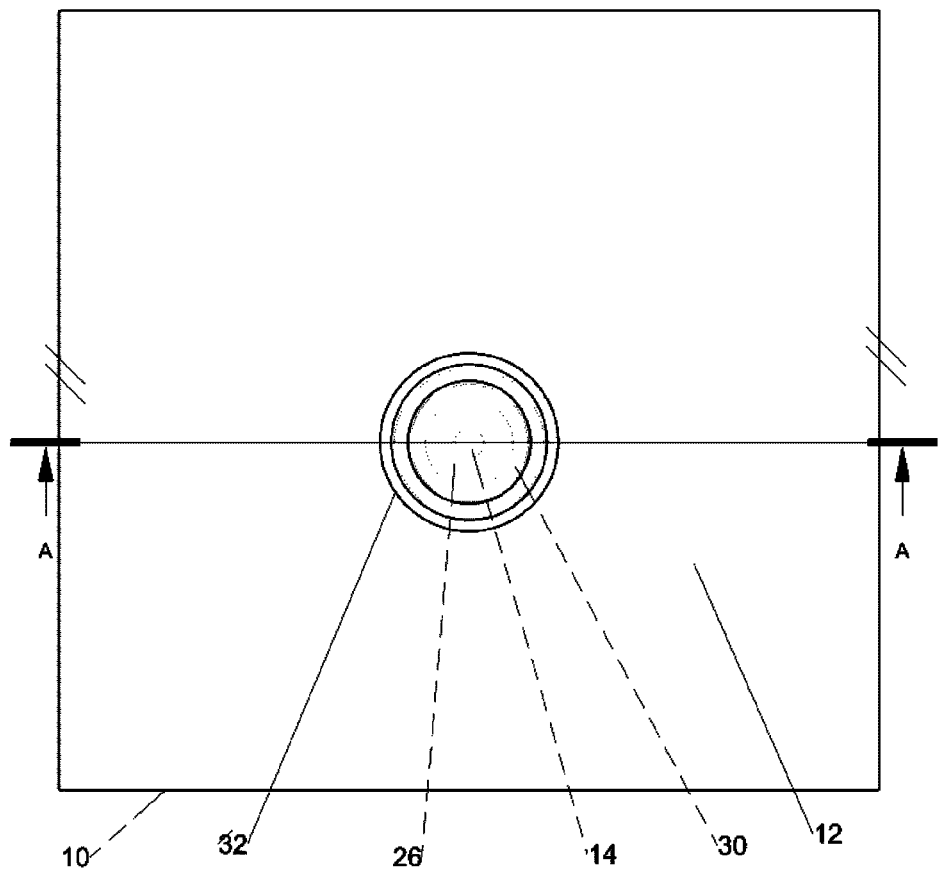
FIG. 6a shows a top view of the patch and outer protective wrap firmly affixed to the membrane on the pipe.
Figure 6B:
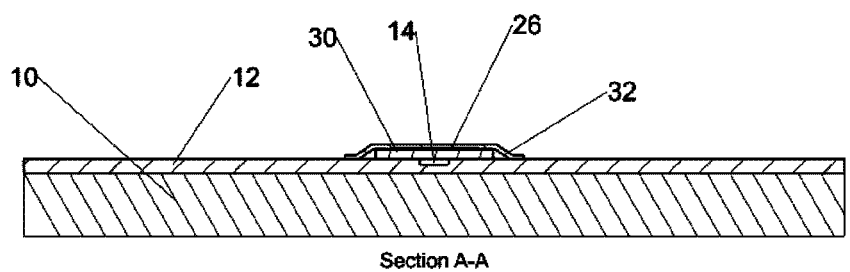

The device includes an arm 24 having first and second end portions, the first end portion is hingedly or pivotally attached to the top surface of the support member 22 and pivotally movable between a closed position (FIG. 4a) and an open position (FIG. 5). The outer bottom surface of the protective outer wrap member 32 is detachably attached to a bottom surface of the second end portion of the arm 24. The arm 24 has a length selected such that when in the closed position the patch member 30 is generally centrally located in the aperture 40. It will be appreciated that while in the Figures the end portion of arm 24 to which patch 30 is releasably attached is not exactly the same size as patch 30, it may be constructed to be the same size, or it may be different. The size and shape of the patch member 30 is not restricted to being disc shaped, they may be square, rectangular depending on the circumstances. The patch kit may be produced to applying elongate rectangular patches to membranes such as in cases where a membrane has a split or elongate crack. Thus the applicator may be configured and shaped to be longer than its width.

Figure 4C:
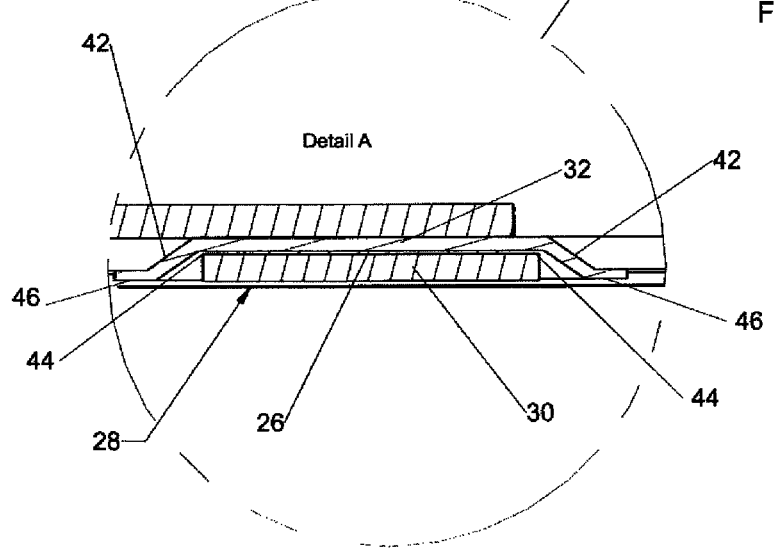
FIG. 4c shows a blow-up showing more detail of FIG. 4b.

Referring to FIG. 4c, in an embodiment the protective outer wrap 32 is rigid or a flexible tape and the recessed portion defines a circumferentially disposed side wall 42 extending outwardly away from the inner bottom surface 44 to provide a side wall chamfered transition between the inner bottom surface 44 and an outer peripheral circumferentially disposed side wall section 46 that is substantially parallel to the inner bottom surface 44. The outer peripheral circumferentially disposed side wall section being coplanar with the bottom surface of the patch member 30 which is contact with the top of membrane 12, and has an adhesive located thereon for bonding the side wall section 46 to said membrane 12.

In an embodiment the chamfered transition of the side wall 42 may have an angle of about 45° with respect to the inner bottom surface 44 of the protective outer wrap 32. This angled or chamfered outer wrap helps to protect patch 30 once the pipe has been buried in the event earth moves over the patch 30 and protective outer wrap 32 as the angle will help deflect the earth passing over it much better than a wrap not having a chamfered transition.

In an embodiment the patch member 30 may have a complimentary shape matched to the recessed portion with of protective outer wrap 32 so that the chamfered transition of side wall 42 is completely filled by the patch member 30.

In an embodiment the kit may include unique identifier permanently 26 affixed to either the top of the protective outer wrap 32 or it may be sandwiched between the inner bottom surface 44 of wrap 32 and the top surface of patch member 30, see FIG. 4c. In an embodiment the unique identifier 26 may be a barcode, or it may be a radio frequency identification device (RFID).

In an embodiment the patch member may be made of a conforming material such that upon application of the patch member 30 by the patch applicator 20 to the defect 14 in the membrane 12, the conforming material fills a void produced by the defect 14.

In an embodiment the patch member 30 may be made of a polymeric material, such as, but not limited to, polyethylene, polypropylene, polyvinylchloride (PVC) and polycarbonate. Alternatively, the patch member 30 may be made from flexible non-curing materials, multi component resins (curing or non-curing) urethanes, polymers or other materials to mention a few non-limiting examples.

In use, once all the defects 14 in the membrane 12 on a selected section of pipe 10 have been identified and marked with temporary visual indicators 16, the user then applies the patch applicator 20 to the defect by removing protective film 38 is removed from the bottom surface of the support member 22 thus exposing the adhesive layer on the bottom of support member 22 and the latter is temporarily bonded on the membrane 12 of the pipe 10 such that defect 14 in the membrane 12 is generally centrally located within the aperture 40 defined by support member 22. The arm 24 is pivoted to the open position and the removable protective film 28 applied to the bottom surface of the patch member 30 is removed when the arm 24 to expose the bottom surface of the patch member 30. Arm 24 is then pivoted to the closed position such that the bottom surface of the patch member 30 covers the defect 14 and the person applying the patch ensures the patch member 30 is pressed into the defect. The patch member 30, when made of a conforming adhesive material will partially or totally fill the void defined by the defect 14 and bond to membrane 12. The person applying the patch then detaches the protective outer wrap 32 from the bottom surface of the arm 24 and the patch applicator 20 is detached from the membrane 12 to leave behind patch member 30 on the membrane 12 which in turn is covered by the protective outer wrap 32. The process is repeated with all defect sites until the given section of pipe has been treated.

The device disclosed in FIGS. 1 to 6b may be provided in the form of a kit including the patch member and the applicator provided as separate components forming the kit.

FIG. 7 shows a perspective view of another embodiment of a repair device for repairing a membrane defect shown generally at 50 with the device shown on a membrane coat 60 on a pipe 61 during the operation of repairing the membrane 60.

Figure 8:
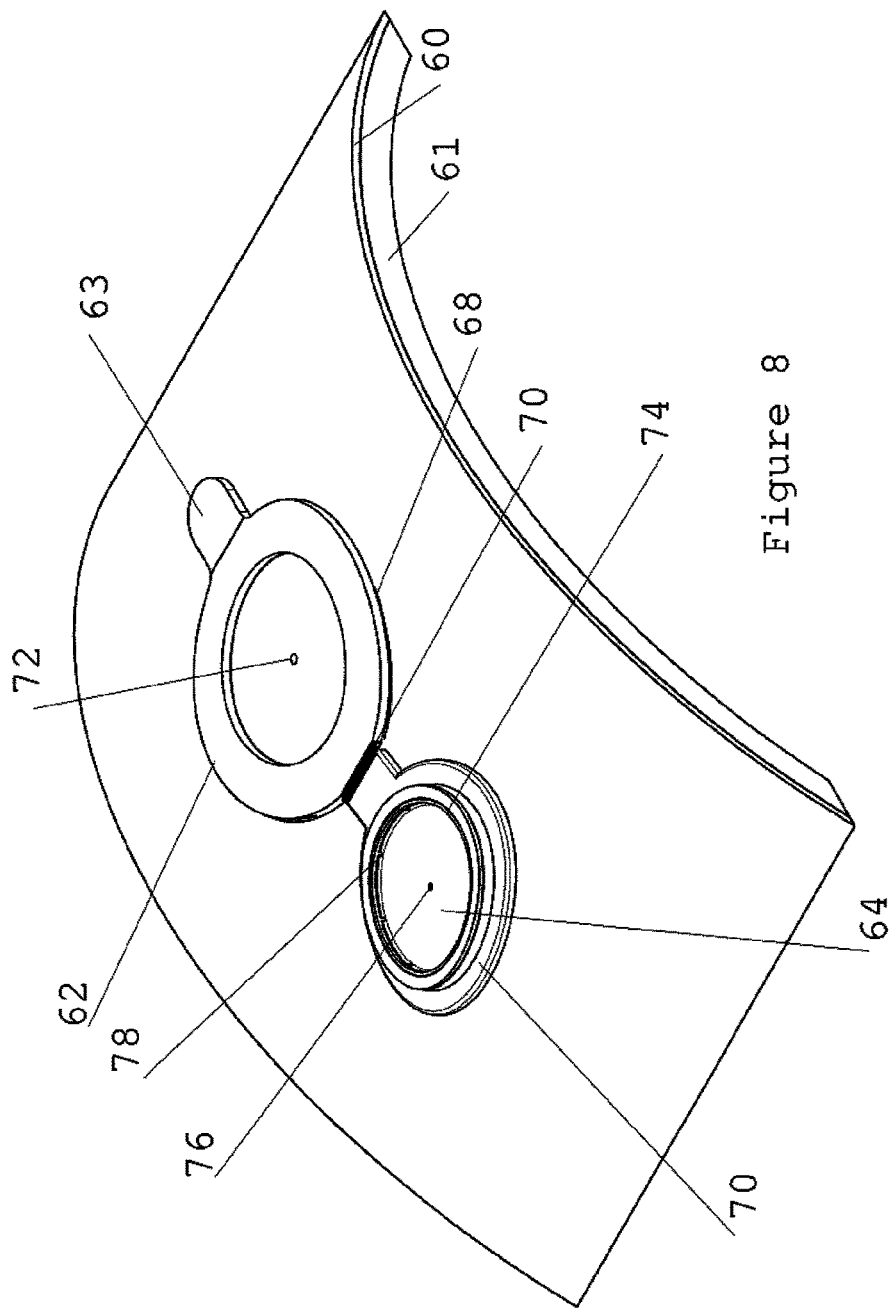
FIG. 8 shows a perspective view of the repair device of FIG. 7 with the device shown in the open position while coupled to the pipe.

FIG. 8 shows a perspective view of the repair device 50 with the device shown in the open position while coupled to the top surface of the membrane 60. Repair device 50 includes ring 62 that may be made of a rigid polymer material. Ring 62 is preferably produced having a curvature of similar radius matching that of the pipe 61. Thus, a repair kit may be produced for repairing different diameter pipes. Typical standard pipes include 10", 16", 24" etc. diameter pipes so that a repair kit could include multiple repair devices with a set number included for a given diameter of pipe. Curved annular ring 62 includes a tab 63 integrally formed therewith which is useful for a user to remove device 50 from the membrane once the patch operation has been completed.

A mould portion (also referred to as a lid) 64 of device 50 is connected to ring 62 by way of a living hinge 70 or other hinge design so that lid portion 64 can be moved from a closed position, see FIG. 7, to an open position, see FIG. 8. As best seen in FIG. 8, mould portion 64 has a centrally disposed hole 76 extending through it which has a diameter sufficient to receive the leading end of a syringe tube 66, Shown in FIGS. 7, 9, 10a and 10b. Lid portion 64 also includes several vent and witness holes 78 disposed around the circular periphery of the mould section 64.

As can be seen from FIG. 8, when the repair is to be performed, the repair device 50 is placed on the membrane 60 with annular ring 62 positioned around the temporary visual indicators 16 covering defect 72 with the defect located approximately in the center of the ring 62. Defects 72 may be a hole, a partial tear etc., in the membrane, with such defects typically being referred to as a "holiday".

Figure 9:
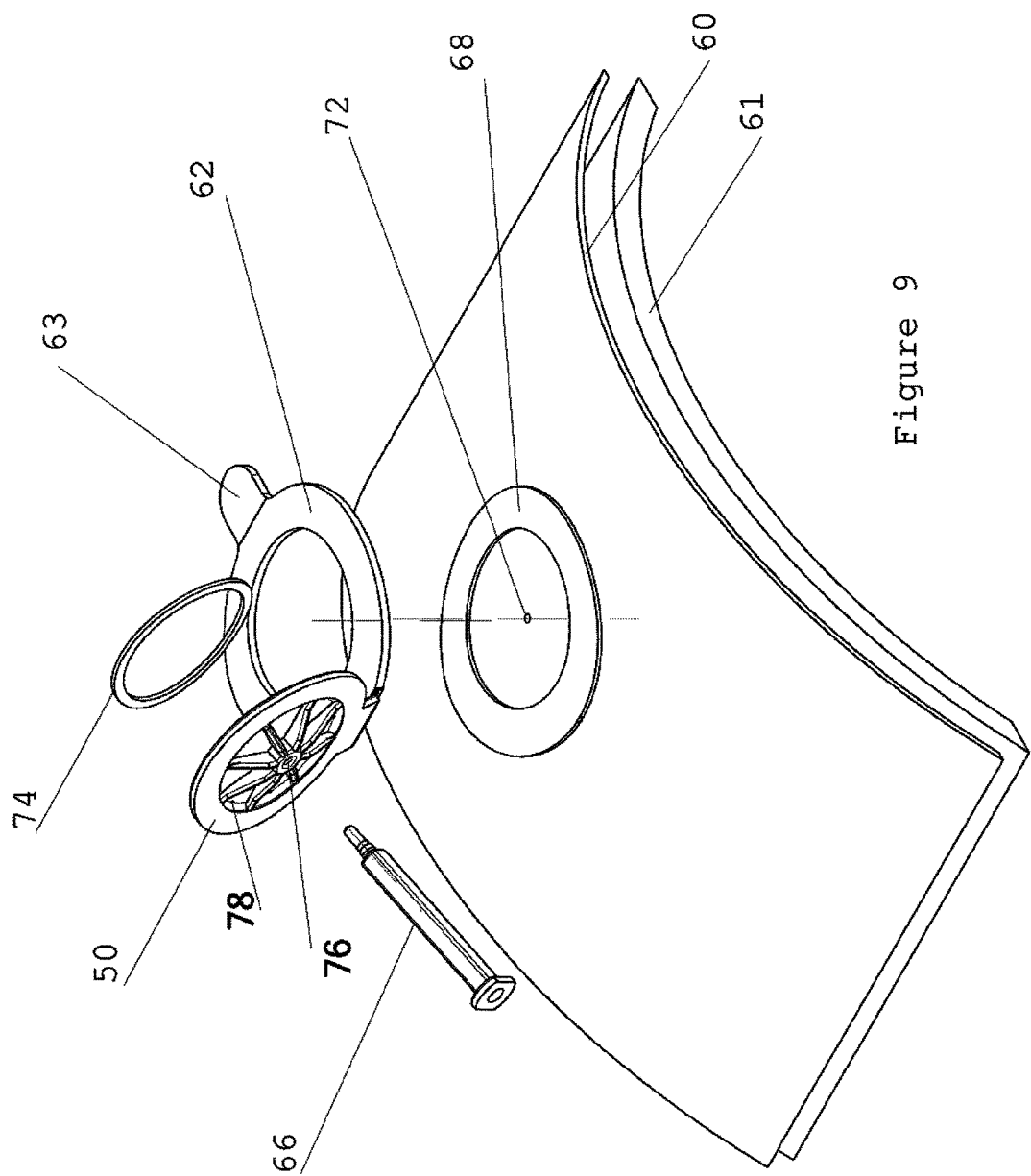
FIG. 9 shows an exploded view of the repair device of FIGS. 7 and 8 above the surface of the pipe.
Figure 10A:
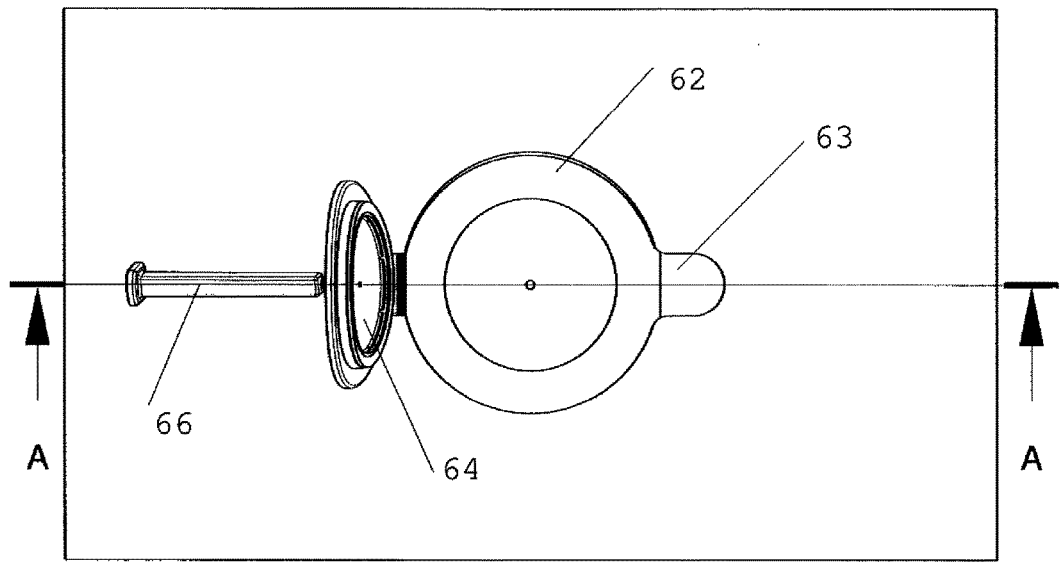
FIG. 10a is a top view of the repair device of FIGS. 7 to 9 mounted on top of the membrane coating the pipe.
Figure 10B:
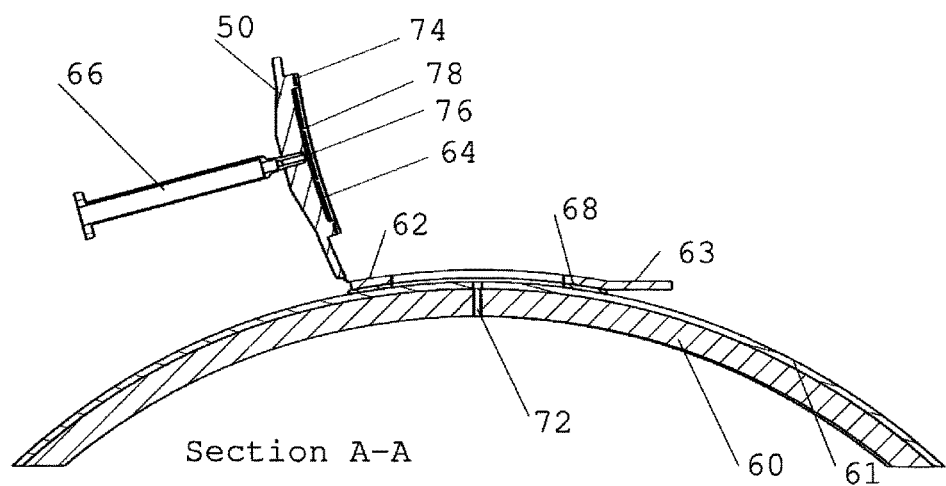

As shown in FIGS. 7 and 9 and 10*b*, repair device 50 includes a ring 62 adhesive connector foam 68 which is an annular ring of the same diameter as ring 62 which has adhesive on both sides so that the ring 62 can be temporarily bonded to the top surface of membrane 60.

With reference to FIG. 8, the inner surface of mould section 64 has a peripheral raised shoulder such that when section 64 is moved to the closed position, a chamber is produced between the top of the membrane 60 and mould section 64 which will be filled with the sealing epoxy.

As shown in FIGS. 8, 9 and 10*b*, repair device 50 includes a mould adhesive connector foam 74 located on the raised peripheral shoulder and which has adhesive on both sides so that the mould portion 64 can be temporarily bonded to the top surface of membrane 60 located on pipe 61 when in the closed position.

FIG. 10*b* shows a cross sectional view taken along the line A-A of FIG. 10*a* as can be seen when repair device 50 is mounted on membrane 60 the radius of curvature of ring 62 exactly matches the curvature of the pipe 61 so there are no gaps between ring 62 and membrane 60.

In operation, the holiday defects in a given length of pipe are first detected, and a temporary identification patch with a light adhesive is placed over the defect, the patch being brightly colored in one embodiment for easy visual detection. Once all the holiday defects 72 have been identified and located in membrane 60 in the given length of pipe, the user removes the protective sheet on the bottom of ring 62 adhesive connector foam 68, centers device 50 over the defect 72 (after the temporary identification patch has been removed) with the defect in the center of ring 62 and presses down to temporarily bond ring 62 to the top of the membrane surface 60. The user then removes the protective sheet on the bottom of mould adhesive connector foam 74 and mould portion 64 is pivoted from the open position (FIG. 10*b*) to the closed position (FIG. 7) whereby the bottom surface of adhesive connector foam 74 bonds mould portion 64 to the top surface of membrane 60, thereby forming a seal. The syringe 66, filled with epoxy, is inserted with its leading tip into hole 76 in mould portion 64. The user then activates the plunger in syringe 66 to inject the epoxy into the chamber defined between the closed mould section 64 and the top surface of membrane 60 encircled by ring 62 at the center of which is defect 72. Once the chamber is filled with epoxy, any excess epoxy will flow out through the holes 78 which will inform the user that the chamber is filled with epoxy and no more is needed. It is noted that when injecting the liquid into the chamber air will be expelled through holes 78 as it is being filled with the liquid to prevent air bubbles being formed in the patch. The epoxy is allowed to set for a few minutes and once it is set the user can remove the entire repair device 50 from the top surface of membrane 60 by prying up on tab 63 thereby releasing adhesive rings 68 and 74 from membrane 60.

Figure 10C:
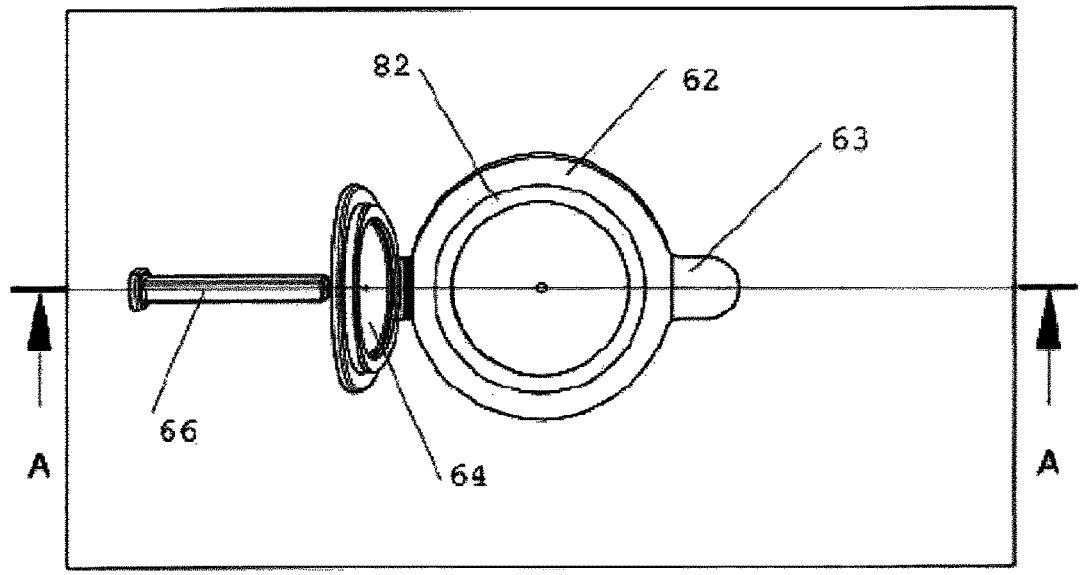
FIG. 10c is a top view of an embodiment of the repair device of having an O-ring incorporated into it.
Figure 10D:
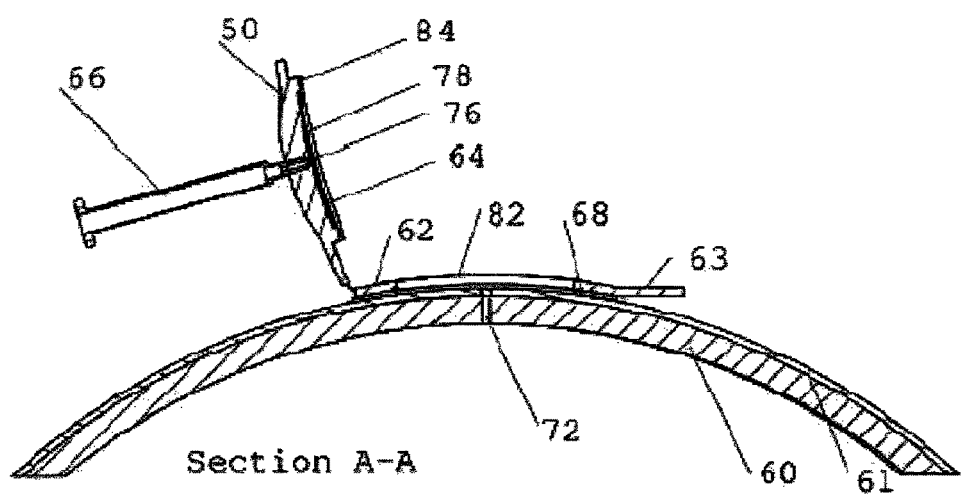
FIG. 10d a cross sectional view taken along the line A-A of FIG. 10C.

FIGS. 10*c* and 10*d* show a particular embodiment of the repair device 50 wherein the patch member includes a rubber O-ring 84 affixed to the peripheral edge of lid 64 which replaces ring 74 in FIG. 10*b* and may be made from a variation of materials including but not limited to rubber, silicon, polyethylene and neoprene. When the mould portion or lid 64 is in the closed position, the lid 64 bonds to adhesive ring 82 and the O-ring forms a seal that will prevent any liquid from flowing out of the enclosed chamber. It will be appreciated that the adhesive ring 82 could be either where it is shown in FIG. 10C on the outer ring 62, or on the lid 64 on the outside of the peripheral edge, or the recessed edge.

FIG. 11 shows the patched membrane 60 after remove of the repair device 50 leaving behind the patch 80 covering the defect 72.

The material from which patch 80 is made may be made of any one or combination of epoxies, urethanes, ultra-violet curing compounds or other resinous materials.

The device disclosed and illustrated in FIGS. 7 to 11 may be provided in the form of a kit including the syringe holding the liquid precursor of the sealant material and the applicator being provided as separate components forming the kit.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A device for repairing membranes coating metal pipes and metal storage tanks, comprising:
   a) a patch member having top and bottom surfaces, a protective outer wrap having an inner bottom surface and an outer bottom surface, the protective outer wrap including a recessed portion having a size and shape to receive therein the patch member such that said top surface of said patch member is in physical contact with said inner bottom surface of said recessed portion, a removable protective film applied to the bottom surface of said patch member;
   b) a patch applicator including
   i) a support member having a top surface, bottom surface, an aperture extending therethrough and an adhesive layer coated on said bottom surface and a removable protective film applied over said adhesive;
   ii) an arm having first and second end portions, said first end portion hingedly attached to said top surface of said support member and pivotally movable between a closed position and an open position, said outer bottom surface of said protective outer wrap member being detachably attached to a bottom surface of said second end portion of said arm, said arm having a length selected such that when in the closed position the patch member is generally centrally located in the aperture; and
   c) wherein in use said bottom surface of said support member is temporarily bonded on a membrane of a pipe or storage tank such that a defect in the membrane is generally centrally located within said aperture, said removable protective film applied to the bottom surface of said patch member is removed when the arm is in the open position to expose said bottom surface of said patch member and pivoting said arm to said closed position such that said bottom surface of said patch member covers the defect, and said protective outer wrap is detached from said bottom surface of said arm and said patch applicator is detached from said membrane to leave behind said patch member on said membrane which is covered by said protective outer wrap.

2. The device according to claim 1 wherein said protective outer wrap is rigid and said recessed portion defines an circumferentially disposed side wall extending outwardly away from said inner bottom surface to provide a side wall chamfered transition between said inner bottom surface and an outer peripheral circumferentially disposed side wall section that is substantially parallel to said inner bottom surface, said outer peripheral circumferentially disposed side wall section being coplanar with said bottom surface of said patch member and having an adhesive located thereon for bonding to said membrane.

3. The device according to claim 2, wherein said chamfered transition of said side wall has an angle of about 45° with respect to said inner bottom surface of said protective outer wrap.

4. The device according to claim 2, wherein said patch member has a complimentary shape matched to said recessed portion with said chamfered transition of side wall such that said recessed portion is completely filled by said patch member.

5. The device according to claim 1, including a temporary removable indicator patch for application to a defect site on the membrane for visually marking the defect site prior to temporarily bonding said patch applicator to said membrane.

6. The device according to claim 1 including unique identifier permanently affixed to said protective outer wrap.

7. The device according to claim 6 wherein said unique identifier is a barcode.

8. The device according to claim 6 wherein said unique identifier is a radio frequency identification device (RFID).

9. The device according to claim 1 wherein said patch member is made of a conforming material such that upon application of the patch member by said patch applicator to the defect in the membrane, the conforming material fills a void produced by the defect.

10. The device according to claim 1 wherein said patch member is made of a polymeric material.

11. The device according to claim 10, wherein said polymeric material is any one of polyethylene, polypropylene, polyvinylchloride (PVC) and polycarbonate.

12. The device according to claim 1 wherein said patch member is made from flexible non-curing materials, multi component resins (curing or non-curing) urethanes.

13. The device according to claim 1 in the form of a kit including the patch member and the applicator as separate components forming the kit.

14. A device for repairing membranes coating metal pipes and metal storage tanks, comprising:
   a) a syringe for holding a liquid precursor of a sealant material;
   b) an applicator including
      i) support member having a top surface, a bottom surface, an aperture extending therethrough and a first adhesive layer coated on said bottom surface;
      ii) a lid portion having first and second end portions, said first end portion hingedly attached to said support member and pivotally movable between a closed position and an open position, said lid portion having an inner surface with a raised peripheral shoulder and a second adhesive layer being coated on the raised peripheral shoulder, said lid portion having an aperture extending therethrough for receiving an exit tip of said syringe, and a plurality of vent holes disposed around the periphery of the lid portion adjacent to the raised peripheral shoulder; and
   d) wherein in operation, said support member is positioned over a defect in a membrane with said defect generally centered in said aperture, said support member is pressed into said membrane to temporarily bond to said membrane via said first adhesive layer, and wherein said lid portion is pivoted into the closed position and pressed onto the top surface of said support member to temporarily bond to a top of the membrane via said second adhesive layer, and wherein said exit tip of said syringe is inserted into said aperture and the liquid precursor is injected into a chamber defined between said membrane and an interior surface of said lid portion, and upon liquid precursor exiting said chamber through said vent holes, ceasing injection of further liquid precursor and allowing the liquid precursor to cure to solid form and thereafter removing the syringe and applicator leaving behind a patched defect.

15. The device according to claim 14 including removable protective films applied over said first and second adhesive layers, which are removed during the patching process.

16. The device according to claim 14 wherein said lid portion and said support member are made of a polymer or plastic material, and wherein said lid portion is hingedly attached to said support member via a living hinge.

17. The device according to claim 14 wherein said sealant material is any one or combination of epoxies, urethanes, ultra-violet curing compounds or other resinous materials.

18. The device according to claim 14 wherein said inner surface of said lid portion includes an O-ring incorporated into said inner surface and peripherally disposed on an outside of said raised peripheral shoulder to prevent liquid from passing out of said chamber.

19. The device according to claim 14 wherein said inner surface of said lid portion includes an O-ring incorporated into said inner surface and peripherally disposed on an inside of said raised peripheral shoulder to prevent liquid from passing out of said chamber.

20. The device according to claim 18 wherein the O-ring is made of any one of rubber, silicon, polyethylene and neoprene.

21. The device according to claim 14 in the form of a kit including the syringe holding the liquid precursor of the sealant material and the applicator being separate components forming the kit.

* * * * *